US007962711B2

(12) United States Patent
Osborne et al.

(10) Patent No.: US 7,962,711 B2
(45) Date of Patent: Jun. 14, 2011

(54) PRE-CACHING FILES FROM REMOVABLE DEVICE TO EXPEDITE PERCEIVED DOWNLOAD PERFORMANCE

(75) Inventors: Craig Anthony Osborne, Issaquah, WA (US); Brendan Clarke Fields, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 643 days.

(21) Appl. No.: 12/034,623

(22) Filed: Feb. 20, 2008

(65) Prior Publication Data
US 2009/0210641 A1 Aug. 20, 2009

(51) Int. Cl.
G06F 12/00 (2006.01)
(52) U.S. Cl. ............... 711/162; 711/137; 711/E12.028
(58) Field of Classification Search .............. 711/167, 711/162, 137, 118, 161
See application file for complete search history.

(56) References Cited

U.S. PATENT DOCUMENTS

| 6,272,593 | B1 | 8/2001 | Dujari |
| 6,710,787 | B1 | 3/2004 | Eves et al. |
| 2003/0075067 | A1* | 4/2003 | Welch et al. ............... 101/483 |
| 2003/0093476 | A1 | 5/2003 | Syed |
| 2004/0070672 | A1* | 4/2004 | Iwami et al. ............... 348/207.2 |
| 2004/0243635 | A1* | 12/2004 | Christophersen et al. . 707/104.1 |
| 2005/0210119 | A1 | 9/2005 | Kumar |
| 2005/0223165 | A1 | 10/2005 | Schmidt et al. |
| 2006/0171661 | A1 | 8/2006 | Hanes |
| 2006/0253608 | A1 | 11/2006 | Reynolds et al. |
| 2007/0027929 | A1 | 2/2007 | Whelan |
| 2007/0121551 | A1 | 5/2007 | Rouffet et al. |
| 2007/0136533 | A1 | 6/2007 | Church et al. |

OTHER PUBLICATIONS

"What's New in Nero?", vol. 3, Issue 3, Mar. 2005, Sandhills Publishing Company, pp. 1-5.

* cited by examiner

Primary Examiner — Pierre-Michel Bataille
(74) Attorney, Agent, or Firm — Capitol City TechLaw; Richard C. Irving

(57) ABSTRACT

A method and a processing device may be provided for detecting a device newly connected to the processing device. The processing device may copy files from the device to a cache of the processing device. In some embodiments, the files may include a digital image files and associated files, such as wav files, or other files. Acquisition processing of the files stored in the cache may be initiated at any time after the processing device begins to copy the files from the device to the cache. Via a user interface, a user may preview thumbnail images corresponding to digital image files stored in one or more virtual devices, corresponding to one or more respective caches. The user may be prompted to initiate acquisition processing of a cache, having unprocessed files, after a configurable amount of time has passed since a file was last copied to the cache.

20 Claims, 10 Drawing Sheets

PRE-CACHING FILES FROM REMOVABLE DEVICE TO EXPEDITE PERCEIVED DOWNLOAD PERFORMANCE

BACKGROUND

"Acquisition", with respect to photo management software, is a process of copying digital image files and associated files, such as, for example, wav files, metadata files, or other files, from a removable storage device, such as, for example, a compact flash (CF), a secure digital (SD) card, a flash drive, or other removable storage device, to local storage of a processing device. In addition to copying the digital image files and the associated files, the acquisition process may rename the files according to a user-defined naming pattern, may automatically apply imaging effects, may write metadata to the files, as well as performing other functions.

Currently, using existing photo management software, a photographer may manage copying of the digital image files and associated files from the removable storage device, and may process the files by, for example, renaming the files, applying imaging effects to the files, writing metadata to the files, or performing other functions with respect to the files, via a single user interface (UI). Thus, to start acquisition processing of files, a photographer may connect a removable storage device to a processing device and may manually configure acquisition processing to copy the files from the removable storage device, to rename the files, to apply imaging effects to the files, to write metadata to the files, or to perform other functions with respect to the files. The process, in existing photo management software, is inefficient because the photographer may interrupt what he or she is doing in order to configure acquisition processing before any files are copied from the removable storage device. Further, when using most photo management software, the photographer may not continue to use the photo management software until the copying of files is completed. In addition, most photo management software may not allow copying from multiple devices to occur simultaneously. Thus, copying from multiple devices may only be performed serially when using most photo management software.

Because photographers may have only a limited number of removable storage devices, the photographer may remove a removable storage device before acquisition processing has completed. When the photographer wishes to continue acquiring the files stored on the removable storage device, the photographer may connect the removable storage device to the processing device and may manually determine which files were moved to the processing device and which files were not moved to the processing device. The photographer may then manually configure acquisition processing to move and process the previously unmoved files.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a processing device may be provided for pre-caching and acquiring digital image files, or other files. When a device having storage is newly connected to a processing device, the processing device may detect the newly connected device, may take a full inventory of files present on the device, and may automatically copy files from the device to a cache of the processing device. Acquisition processing of the files from the cache may be initiated any time after the processing device begins to copy the files from the device to the cache.

If the device is disconnected from the processing device before completion of the copying of the files from the device to the cache, upon reconnecting the device to the processing device, the processing device may refer to the full inventory of the files on the device to determine if any previously detected files were not copied, to determine if any previously detected files were removed from the device, and to determine if any new files were added to the device. The processing device may resume the copying of the files to the cache without creating duplicate files. If previously detected files are determined to be removed from the device or new files are determined to be added to the device, feedback may be provided to the user. An acquisition processing user interface may indicate a current status of a cache, such as, for example, "copying in progress" or another status.

When a device is connected to a processing device, an inventory of files stored on the device may be compared with files stored in one or more caches. When a file match is found with respect to a cache, unmatching files from the device may be copied to the cache.

Via the acquisition processing user interface, the user may select one or more virtual devices, corresponding to respective caches, and may request to view thumbnail images corresponding to digital image files stored in the selected one or more virtual devices.

In some embodiments, the user may be prompted to perform acquisition processing of digital image files of a virtual device, corresponding to a cache, when a predetermined amount of time has passed since unacquired files were copied to the cache.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
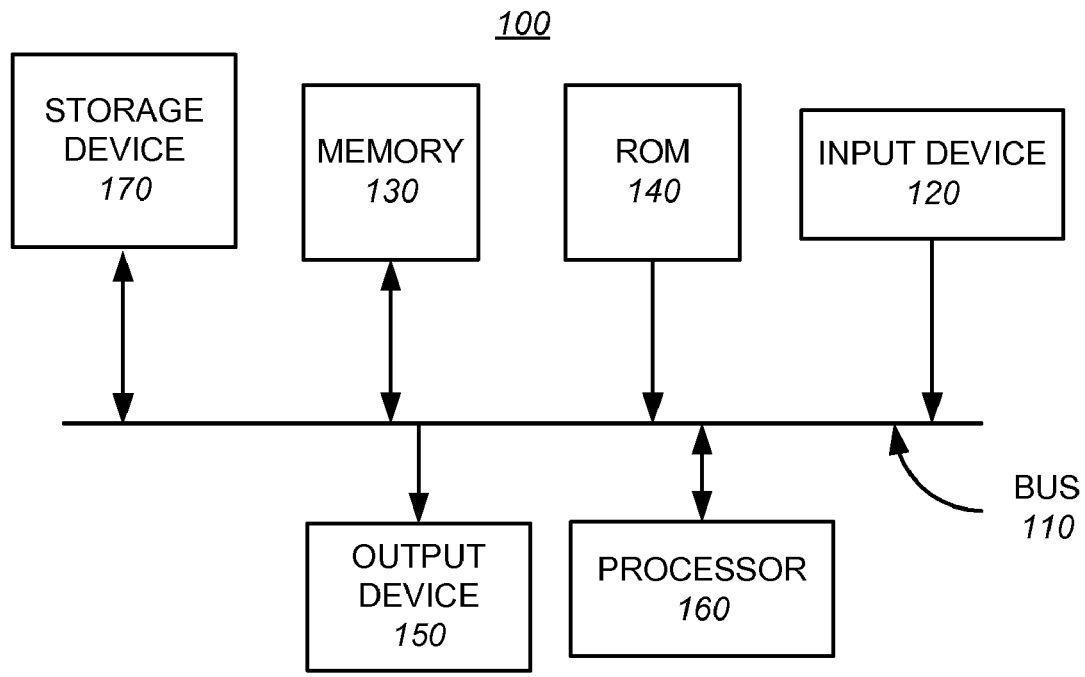
FIG. 1 illustrates a functional block diagram of an exemplary processing device, which may implement embodiments consistent with subject matter of this disclosure.

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Existing photo management applications perform acquisition processing by copying digital image files and associated files, such as, for example, wav files, metadata files, and other associated files, from a removable storage device, and processing the copied files in a single non-interruptible step. Embodiments consistent with the subject matter of this disclosure may provide a method and a processing device which decouple a step of copying the digital image files and the associated files from a removable storage device from a step of processing the copied files.

In various embodiments consistent with the subject matter of this disclosure, a user may connect a removable storage device to a processing device. The processing device may detect the newly connected removable storage device, may determine that files stored on the removable storage device are to be automatically copied to a cache of the processing device, and may automatically copy the files to the cache. At any time after the processing device begins the automatic copying of the files of the removable storage device to the cache, the user may initiate an acquisition processing user interface. The acquisition processing user interface may indicate a status of the cache. For example, if the files from the removable storage device are currently in the process of being copied to the cache, the indicated status may be "copying in progress". When the files from the removable storage device are completely copied to the cache, the removable storage device may be disconnected from the processing device.

In various embodiments, a cache may be in one of a number of states, which may be indicated by a UI. For example, the states may be:
 incomplete copy and storage device not present—This may occur when the storage device was connected, partial copying occurred, and the storage device was removed preventing complete copying;
 complete copy and storage device not present—This may occur when the storage device was connected, complete copying was performed, and the storage device was removed;
 complete copy and storage device present—This may occur when the storage device was connected, complete copying was performed, and the storage device remains connected;
 copy in progress and storage device present—This may occur when the storage device is connected, and copying is in progress. The UI may indicate an amount of copying completed. For example, a progress bar may be displayed showing a percentage of copying completed; and
 incomplete copy and storage device present—This may occur when the storage device was connected, a full copy was attempted, but not all files were copied for some reason, and the storage device remains connected.

In other embodiments, the cache may be in different or additional states, which may be indicated via a UI. For example, the UI may indicate that the cache was copied as a result of multiple insertions and disconnections of the storage device. The UI may further indicate other states of the cache.

When the removable storage device is connected to the processing device, an inventory of files stored on the removable storage device may be compared with files stored in one or more caches. Properties of the files may be automatically compared, such as, for example, a directory structure, a size of the files, filenames, or other properties of the files. When a cache is found having at least one file matching at least one file of the removable storage device, files of the removable storage device, which do not match files of the cache, may be copied from the removable storage device to the cache. Thus, if a user interrupts the copying of the files from the removable storage device by, for example, disconnecting the removable storage device from the processing device while the files are being copied from the removable storage device to the cache, copying of the files from the removable storage device to the cache may be resumed automatically after reconnecting the removable storage device to the processing device.

The user may initiate the acquisition processing user interface at any time after a beginning of the copying of the files from the removable storage device to the cache. The acquisition processing user interface may display a representation of a number of virtual devices, each of the virtual devices may correspond to a different cache. The user may select one or more of the virtual devices, may configure acquisition processing of the virtual devices, and may start the acquisition processing.

Exemplary Processing Device

FIG. 1 is a functional block diagram of an exemplary processing device 100, which may be used to implement embodiments consistent with the subject matter of this disclosure. Processing device 100 may be a desktop personal computer (PC), a laptop PC, a handheld processing device, or other processing device. Processing device 100 may include a bus 110, an input device 120, a memory 130, a read only memory (ROM) 140, an output device 150, a processor 160, and a storage device 170. Bus 110 may permit communication among components of processing device 100.

Processor 160 may include at least one conventional processor or microprocessor that interprets and executes instructions. Memory 130 may be a random access memory (RAM) or another type of dynamic storage device that stores information and instructions for execution by processor 160. Memory 130 may also store temporary variables or other intermediate information used during execution of instructions by processor 160. ROM 140 may include a conventional ROM device or another type of static storage device that stores static information and instructions for processor 160. Storage device 170 may include compact disc (CD), digital video disc (DVD), a magnetic medium, or other type of storage device for storing data and/or instructions for processor 160.

Input device 120 may include a keyboard, a pointing device or other input device. Output device 150 may include one or more conventional mechanisms that output information, including one or more display monitors, or other output devices.

Processing device 100 may perform such functions in response to processor 160 executing sequences of instructions contained in a tangible machine-readable medium, such as, for example, memory 130, ROM 140, storage device 170 or other medium. Such instructions may be read into memory 130 from another machine-readable medium or from a separate device via communication interface 180.

Exemplary Operating Environment

Figure 2:
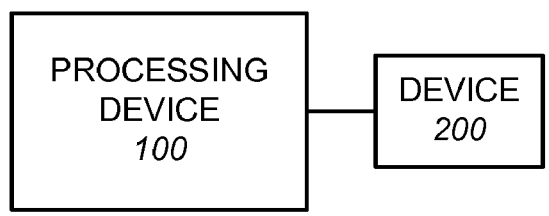
FIG. 2 illustrates an exemplary operating environment for embodiments consistent with the subject matter of this disclosure.

FIG. 2 illustrates an exemplary operating environment. The exemplary operating environment may include a processing device, such as, processing device 100, or another processing device, and a device 200, which may be a removable storage device, or a device including a removable storage device. The removable storage device may be a CF, a SD card, a flash drive, or other removable storage device having files stored thereon, such as, for example, digital image files and associated files. The device including a removable storage device may be a digital camera, or other device, having digital image files and associated files stored on the removable storage device.

Device 200 may be connected to processing device 100 via a port, such as, for example, a universal serial bus (USB) port, or other port. In some embodiments, device 200 may be connected to processing device 100 via a wireless means, such as, for example, a wireless RF connection, an infrared connection, or other wireless connection.

Exemplary Processing

Figure 3:
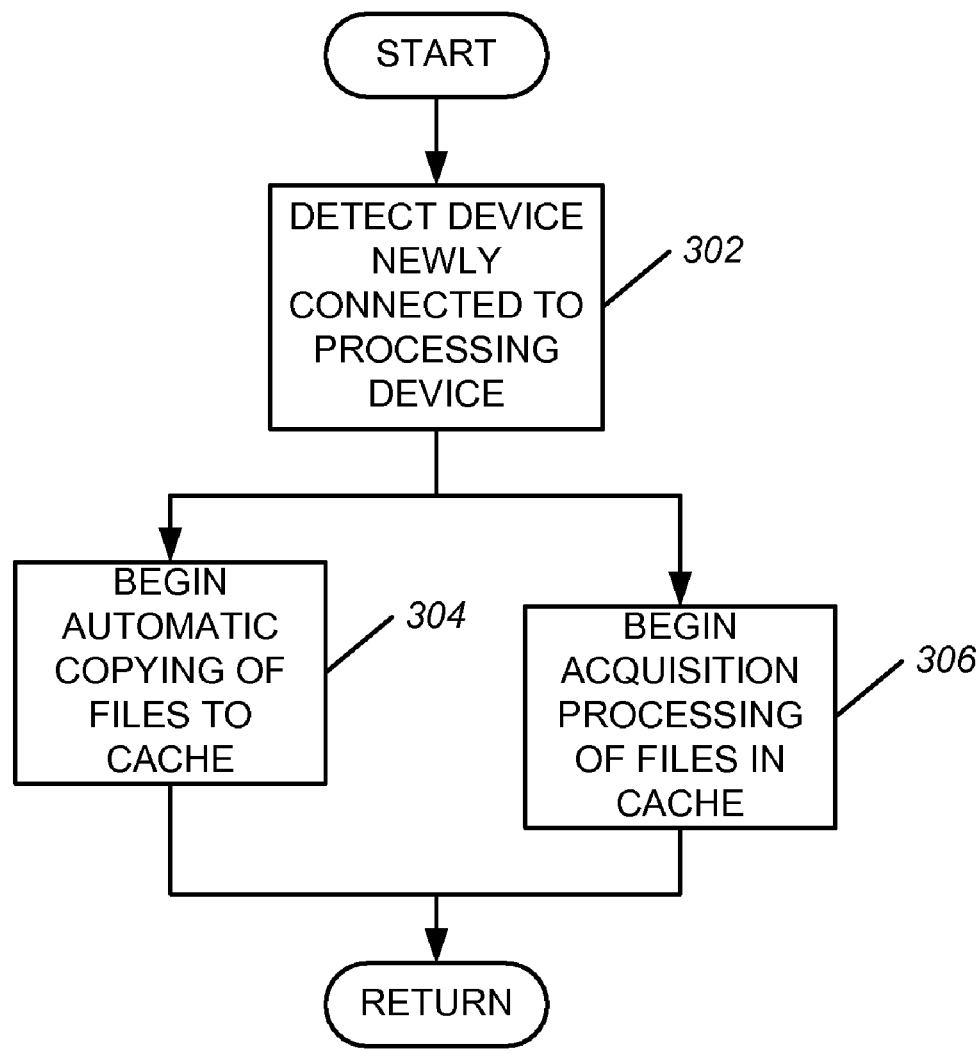
FIG. 3 is a flowchart illustrating an exemplary process, which may be performed in embodiments consistent with the subject matter of this disclosure.

FIG. 3 is a flowchart illustrating an exemplary process, which may be performed in embodiments consistent with the subject matter of this disclosure. The process may begin with a processing device, such as, for example processing device 100, detecting a newly connected device, such as, for example, device 200 (act 302). Processing device 100 may then begin to automatically copy files stored on device 200 to a cache of processing device 100 (act 304). The cache may include storage on a hard disk or other storage medium.

Figure 4:
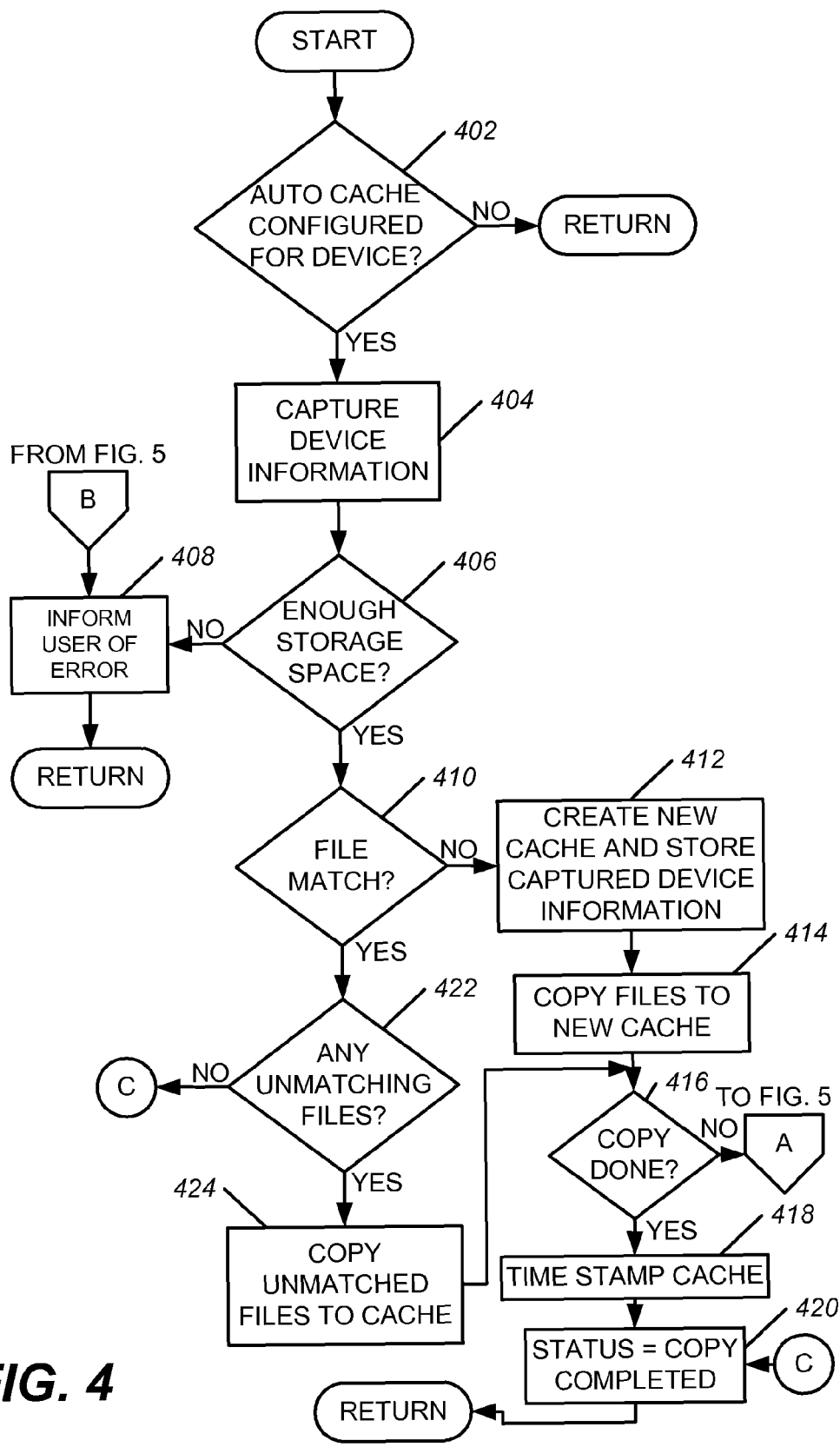
FIGS. 4 and 5 are flowcharts illustrating an exemplary process for performing act 304 FIG. 3.
Figure 5:
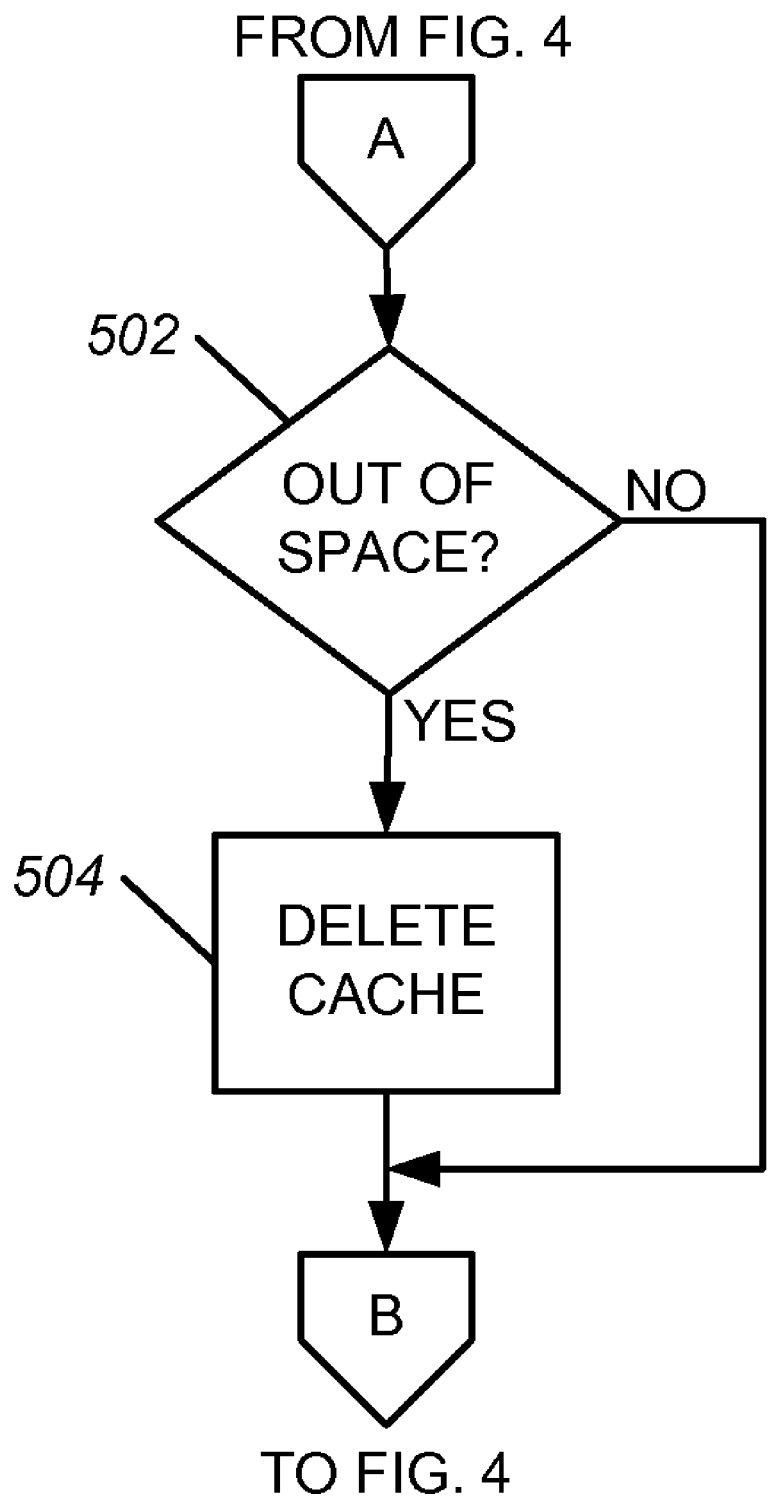

FIGS. 4 and 5 are flowcharts of an exemplary process for performing act 304 in embodiments consistent with the subject matter of this disclosure. The process may begin with processing device 100 determining whether the newly connected device is one which is configured to have at least a portion of contents automatically cached or automatically copied (act 402). As will be discussed below, a user may configure whether auto-caching or copying is enabled and one or more conditions under which auto-caching or copying may be performed. If auto-caching is not to be performed, then the process is completed.

If auto-caching is to be performed, then the processing device may capture information with respect to device 200 (act 404). The captured information may include a type of device 200, a storage capacity of device 200, an inventory of files stored on device 200, as well as other information.

Processing device 100 may then determine whether processing device 100 has enough storage space to store the files stored on device 200 (act 406). If processing device 100 determines that there is not enough storage space, then processing device 100 may inform the user by displaying an error message, or performing another action (act 408).

If, during act 406, processing device 100 determines that processing device 100 does have enough storage space to store the files stored on device 200, then processing device 100 may determine whether any files stored on device 200 match any files stored in any existing caches (act 410). A file match may be determined in a number of different ways. For example, two files having a same filename may be considered to be matching files, two files having a same size and being in a same directory structure may be considered to be matching files, or two files having a same filename and a same size may be considered to be matching files. In other embodiments, other methods for determining a file match may be implemented. Further, a device ID may be created based on a volume name, media size, storage device type, serial number (if present), or other information. A determination may be made regarding an identity of a device based on the device ID.

If, during act 410, no file match is found, processing device 100 may create a new cache and may store the captured device information in one or more files of the cache (act 412) store. In one embodiment, the captured device information may be stored in an eXtensible Markup Language (XML) file. In other embodiments, the captured device information may be stored in other types of files.

Processing device 100 may then automatically copy files, such as, for example, digital image files and associated files, or other types of files, to the new cache (act 414). Processing device 100 may then determine whether the copying of the files is completed (act 416). If processing device 100 determines that the copying of the files is completed, then processing device 100 may then store a timestamp in the cache, indicating a time and date to which the cache was last written (act 418). A status with respect to device 200 may be set to "completed" and may be stored in the cache (act 420). The process may now be completed.

If, during act 416, processing device 100 determines that the copying of the files from device 200 to the cache did not complete, then processing device 100 may determine whether the cache is out of space (act 502; FIG. 5). If the cache is determined to be out of space, then processing device 100 may perform an action, such as deleting the cache (act 504). In some embodiments, the action to be performed when the cache is determined to be out of space may be configurable. Processing device 100 may then perform act 408 (FIG. 4) to inform the user of an error (act 408).

If, during act 410, processing device 100 determines that at least one file of device 200 matches at least one file of a cache, then processing device 100 may determine whether device 200 has stored therein any files which do not match any files in the cache (act 422). If, during act 422, processing device 100 determines that device 200 has stored therein at least one file not matching any files in the cache, then processing device 100 may copy the at least one file not matching any files in the cache to the cache (act 424). Thus, a device which was previously disconnected during copying of files from the device to the cache, may have the copying of uncopied files to the cache automatically resumed, without duplicating files, upon being reconnected to processing device 100. Further, a newly connected device having at least one file matching at least one file of a cache may have unmatched files of the newly connected device copied to the cache. Acts 416-420 may be performed again, as previously described.

The process illustrated by the flowchart of FIG. 4 is only exemplary. The process may vary in other embodiments consistent with the subject matter of this disclosure. For example, if a determination is made that the device includes newly added files, the newly added files may be added to a new cache, as may be indicated via a configuration UI.

Returning to FIG. 3, acquisition processing of the files in the cache may begin at any time after copying of the files from device 200 to the cache has begun (act 306). That is, acquisition processing of the files in the cache may be performed independently of a completion of the copying of the files from device 200.

Figure 6:
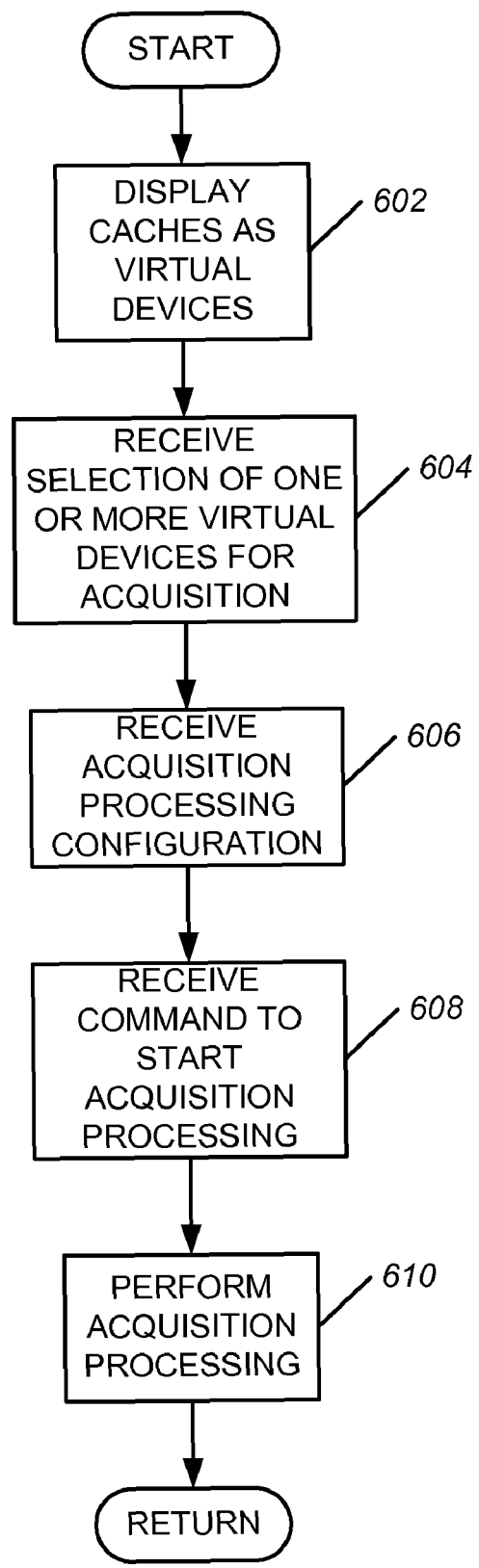
FIG. 6 shows a flowchart of an exemplary process for performing act 306 of FIG. 3.

FIG. 6 is a flowchart illustrating an exemplary process for performing act 306, in embodiments consistent with the subject matter of this disclosure. The process may begin with an acquisition processing user interface displaying one or more caches as virtual devices (act 602). That is, each of the displayed virtual devices may correspond to a different cache of processing device 100. Next, processing device 100 may receive a selection of one or more of the virtual devices for acquisition processing (act 604). The one or more of the virtual devices may be selected by the user via a pointing device, such as, for example a computer mouse, or other pointing device, or via other means.

Next, the user may enter an acquisition processing configuration via the acquisition processing user interface (act 606). The user may configure, for example, a target folder for storing processed files, a pattern indicating a format of source file names, a pattern indicating a format of the target file names, and/or other configuration parameters.

Processing device 100 may then receive, via the acquisition processing user interface, a command to start acquisition processing of files in one or more caches (act 608). Processing device 100, may then perform the acquisition processing of the files in the one or more caches, in response to receiving the command to start the acquisition processing (act 610). The process may then be completed.

Figure 7:
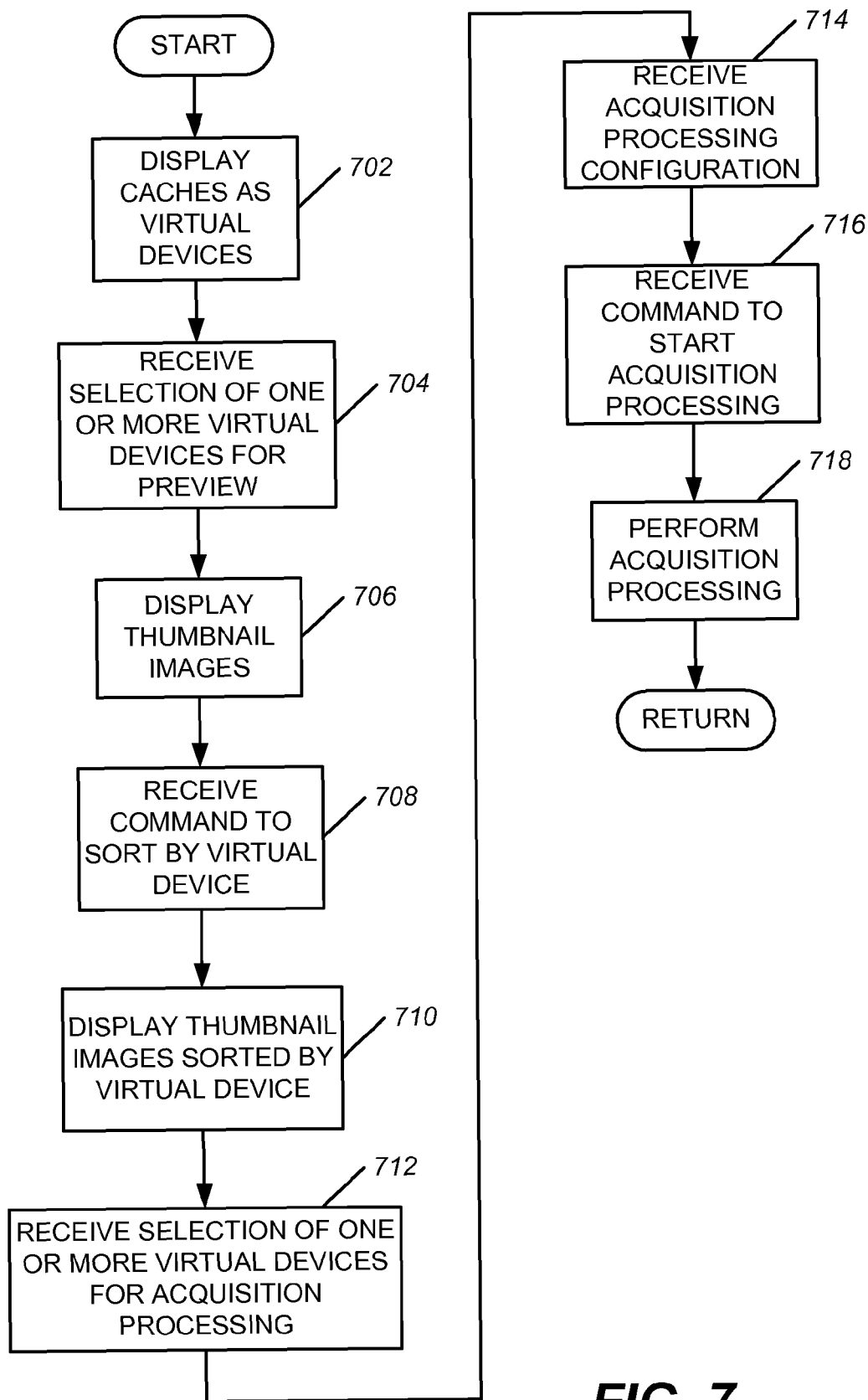
FIG. 7 is a flowchart illustrating another exemplary process which may be performed in embodiments consistent with the subject matter of this disclosure.

FIG. 7 illustrates a flowchart of an exemplary process by which a user may select, via an acquisition processing user interface, one or more virtual devices, may preview thumbnail images corresponding to digital image files stored on the one or more virtual devices (i.e., caches), and may configure and initiate acquisition processing of the one or more virtual devices.

The process may begin with processing device 100 displaying caches as virtual devices via the acquisition processing user interface (act 702). Processing device 100 may receive a selection of the one or more virtual devices for previewing (act 704). The one or more of the virtual devices may be selected by a user via a pointing device, such as, for example a computer mouse, or other pointing device, or via other means. Processing device 100 may then display thumbnail images, corresponding to digital image files stored on the one or more virtual devices (act 706).

Processing device 100 may then receive a command, via the acquisition processing user interface, for sorting the displayed thumbnail images by virtual device (act 708). As a result, processing device 100 may display the thumbnail images sorted by virtual device (act 710). For example, thumbnail images corresponding to digital image files stored on a first virtual device may be displayed, followed by thumbnail images corresponding to digital image files stored on a second virtual device, etc.

Processing device 100 may then receive a selection of one or more virtual devices for acquisition processing (act 712). Processing device 100 may then receive an acquisition processing configuration via the acquisition processing user interface (act 714). The user may then enter a command, via the acquisition processing user interface to start acquisition processing (act 716). In response to receiving the command, processing device 100 may then perform acquisition processing with respect to the files stored on the selected one or more virtual devices, or caches (act 718).

Exemplary Displays

Figure 8:
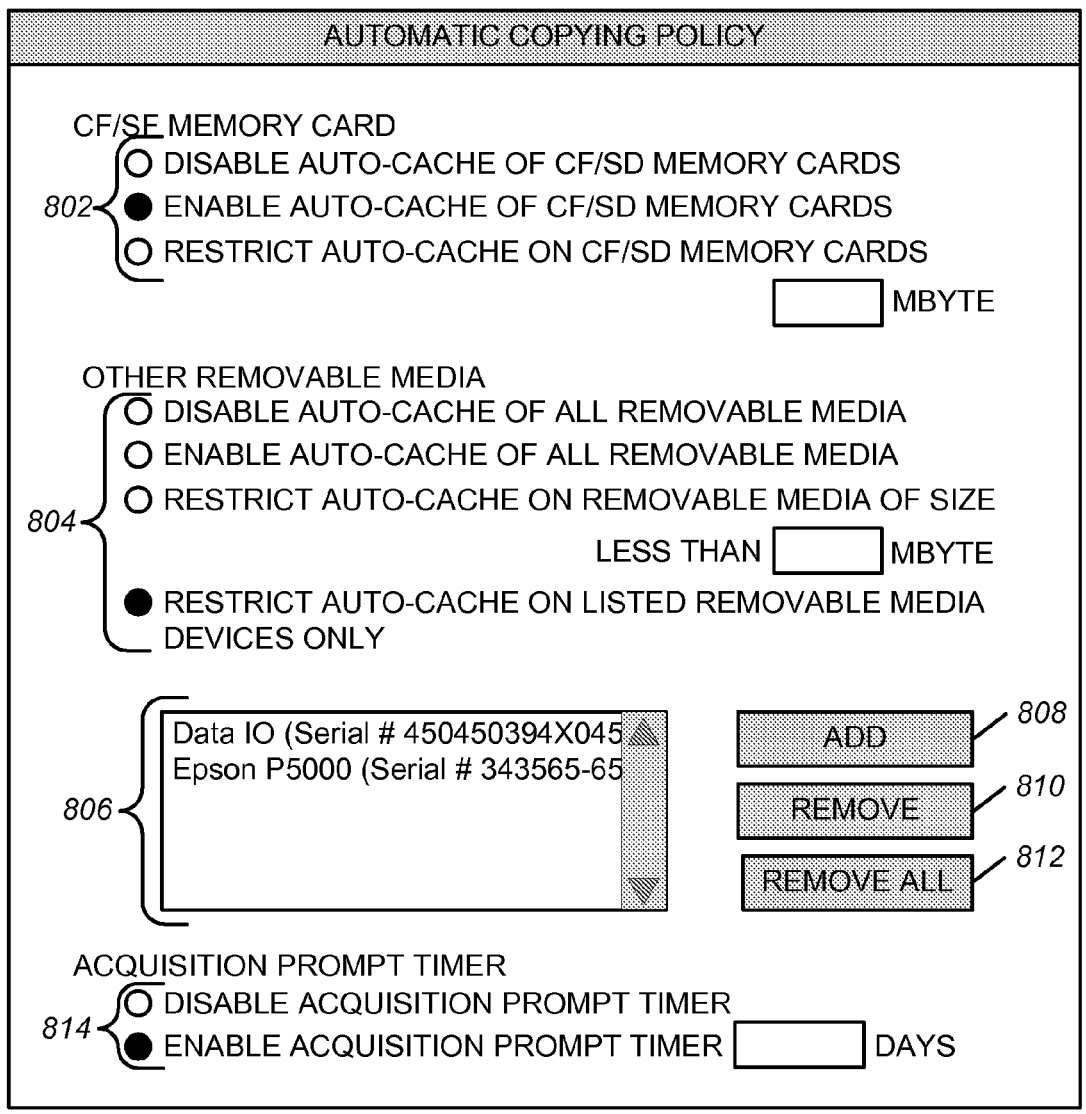
FIGS. 8-11 illustrate exemplary displays, which may be implemented in various embodiments consistent with the subject matter of this disclosure.

FIG. 8 illustrates an exemplary display 800 for configuring one or more conditions under which auto-caching, or copying, from a device, such as device 200, may be performed. According to display 800, a user may select one of selections 802 to indicate whether auto-caching of a removable storage device, such as a CF memory card, a SD memory card, or other device having storage, may be enabled. The user may select the one of selections 802 by using a pointing device, such as, for example, a computer mouse, or another input means. Selections 802 may include disabling auto-caching of CF and SD memory cards, enabling auto-caching of CF and SD memory cards, and restricting auto-caching of CF and SD memory cards to a configurable number of units of storage, such as megabytes, or another unit of storage.

The user may further select one of selections 804 to configure conditions for performing auto-caching of removable media, other than CF and SD memory cards. The one or more of selections 804 may include disabling auto-caching of all removable media, enabling auto-caching of all removable media, restricting auto-caching on removable media having less than a particular unit of size in megabytes, or another unit, and restricting auto-caching to only certain listed removable media devices, as may be specified in window 806. The user may select button "add" 808 to add a device to window 806, button "remove" 810 to remove a device listed in window 806, or button "remove all" 812 to remove all devices listed in the window 806.

The user may select one of selections 814 to disable an acquisition prompt timer, or enable the acquisition prompt timer for a certain number of time units, such as, for example, days, or another time unit. If the user chooses to enable the acquisition prompt timer for a certain period of time, to ensure that files of a cache are not sitting unacquired, the user may be prompted regarding acquisition of the cache after expiration of the acquisition prompt timer when files in the cache have not been acquired. The user may dismiss the prompt or postpone acquisition for another period of time. As mentioned previously, with respect to act 418 (FIG. 4), each cache may be time stamped upon completion of copying files to a respective cache.

Figure 9:
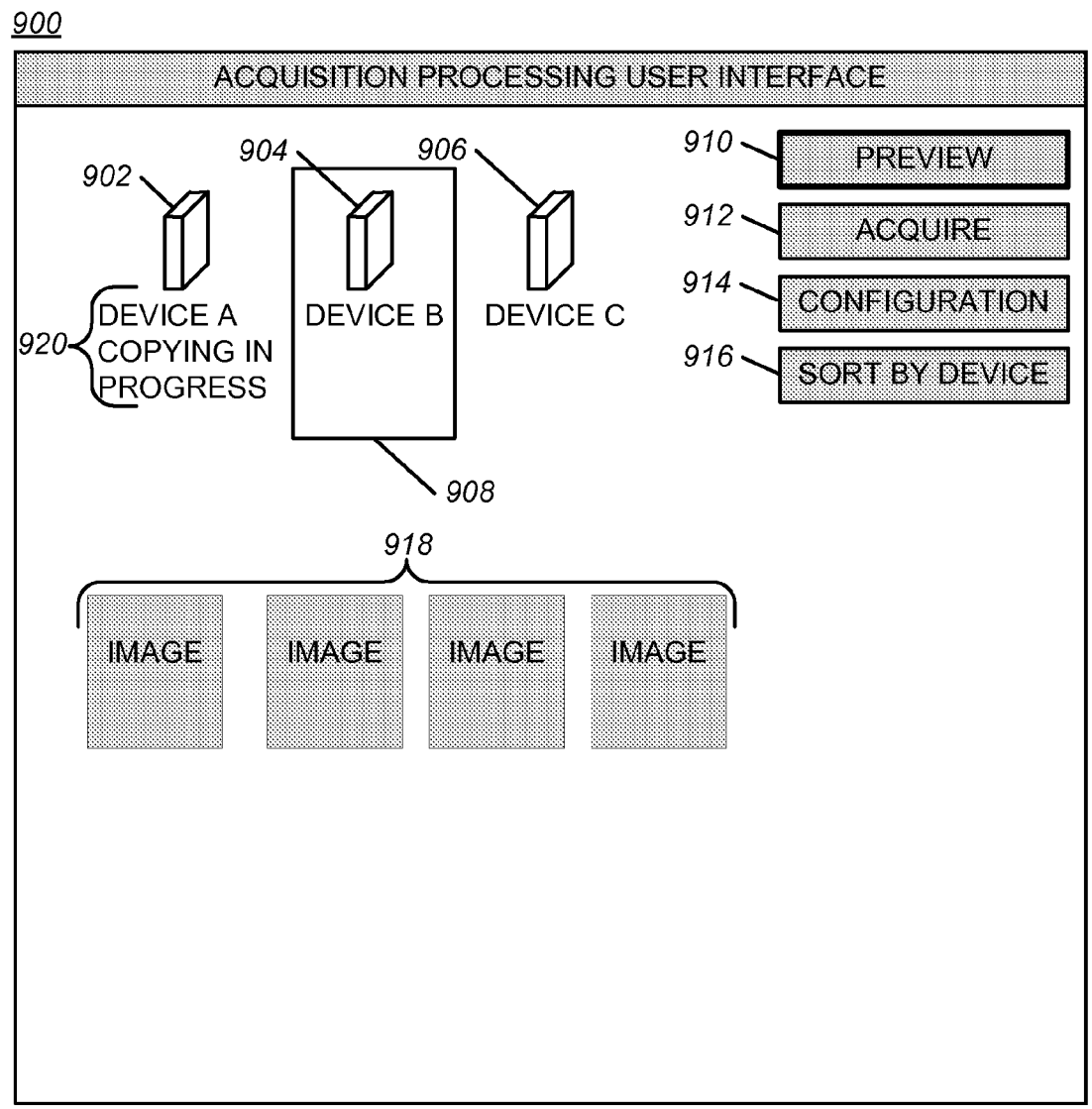

FIG. 9 illustrates an exemplary display 900 of the acquisition processing user interface. Display 900 may show representations of one or more virtual devices 902, 904, 906, each of which may correspond to a different cache of a processing device, such as, for example, processing device 100. The user may select one of virtual devices 902, 904, 906 and processing device 100 may cause an indication 908 to be displayed to confirm the selection. Display 900 may include a "preview" button 910, an "acquire" button 912, a "configuration" button 914 and a "sort by device" button 916. In display 900, the user selected "preview" button 910 to cause thumbnail images 918, corresponding to digital image files stored on the selected virtual device (virtual device 904, in this example) to be displayed. Further, a status of a virtual device may be displayed, such as, for example, status 920 showing, in this example, that copying is in progress with respect to copying files from a device to a cache, represented by virtual device 902. The acquisition processing user interface may further distinguish virtual devices from non-virtual devices (i.e., cache turned off for device, etc.) by displaying one type of icon to represent virtual devices and another type of icon to represent non-virtual devices. Alternatively, icons representing virtual devices may be displayed in one color while icons representing non-virtual devices may be displayed in another color. Further, the acquisition processing user interface may display device information with respect to each device, such as, for example, number of files included on the device, file extensions of files, device or volume name, device type, total capacity of device, total unused capacity of device, status, as well as other or different information.

Figure 10:
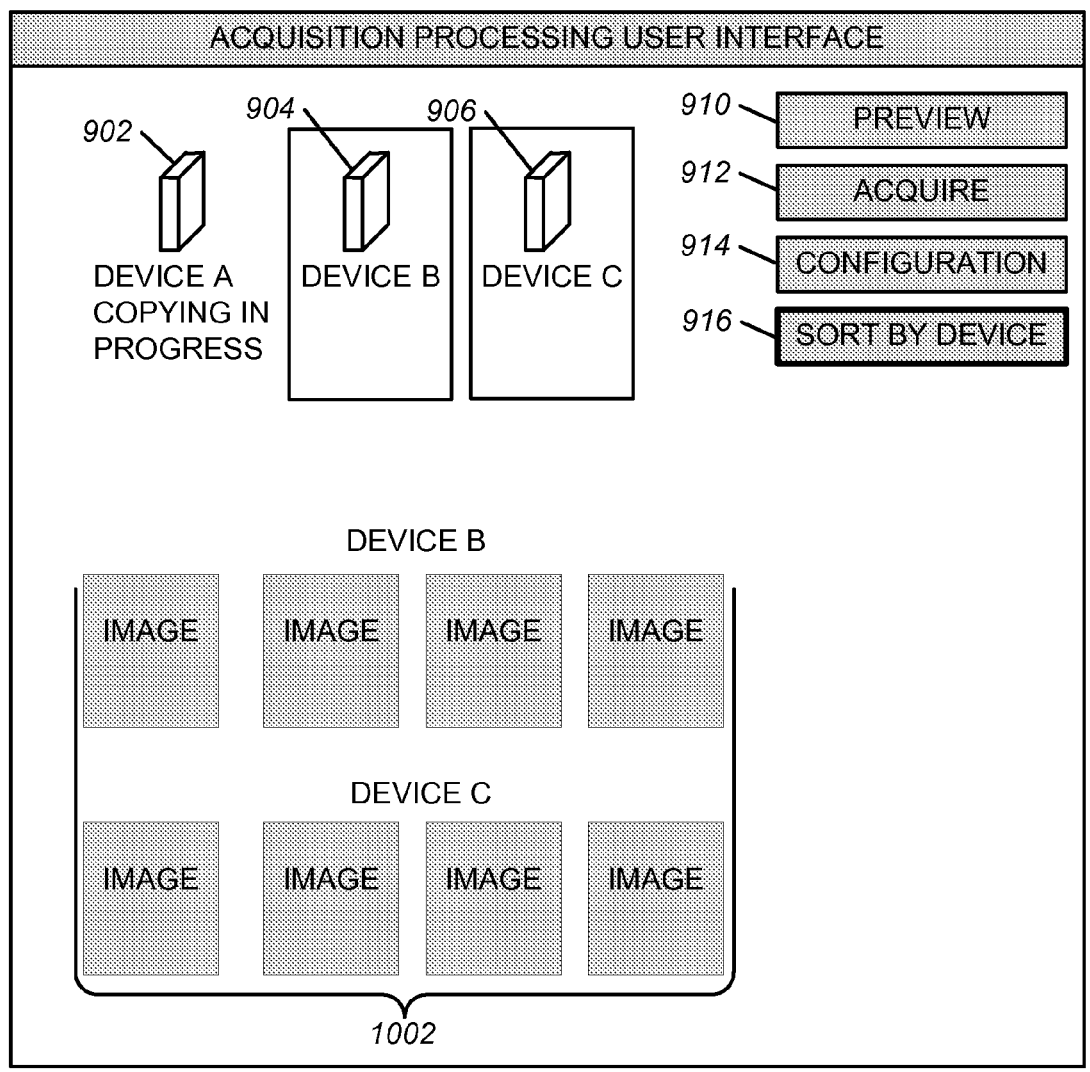

FIG. 10 shows an exemplary display 1000 of the acquisition processing user interface. Display 1000 is similar to the example of display 900, but in this example, the user selected multiple virtual devices 904, 906 and "preview" button 910 to display digital images 1002 corresponding to contents of the selected multiple virtual devices 904, 906. Initially, thumbnail images 1002 may be displayed in no particular order, with no reference to a particular virtual device. The user may select "sort by device" button 916 to sort the displayed thumbnail images 1002 by device, such that, one may easily determine on which of the virtual devices a corresponding digital image file is stored.

Figure 11:
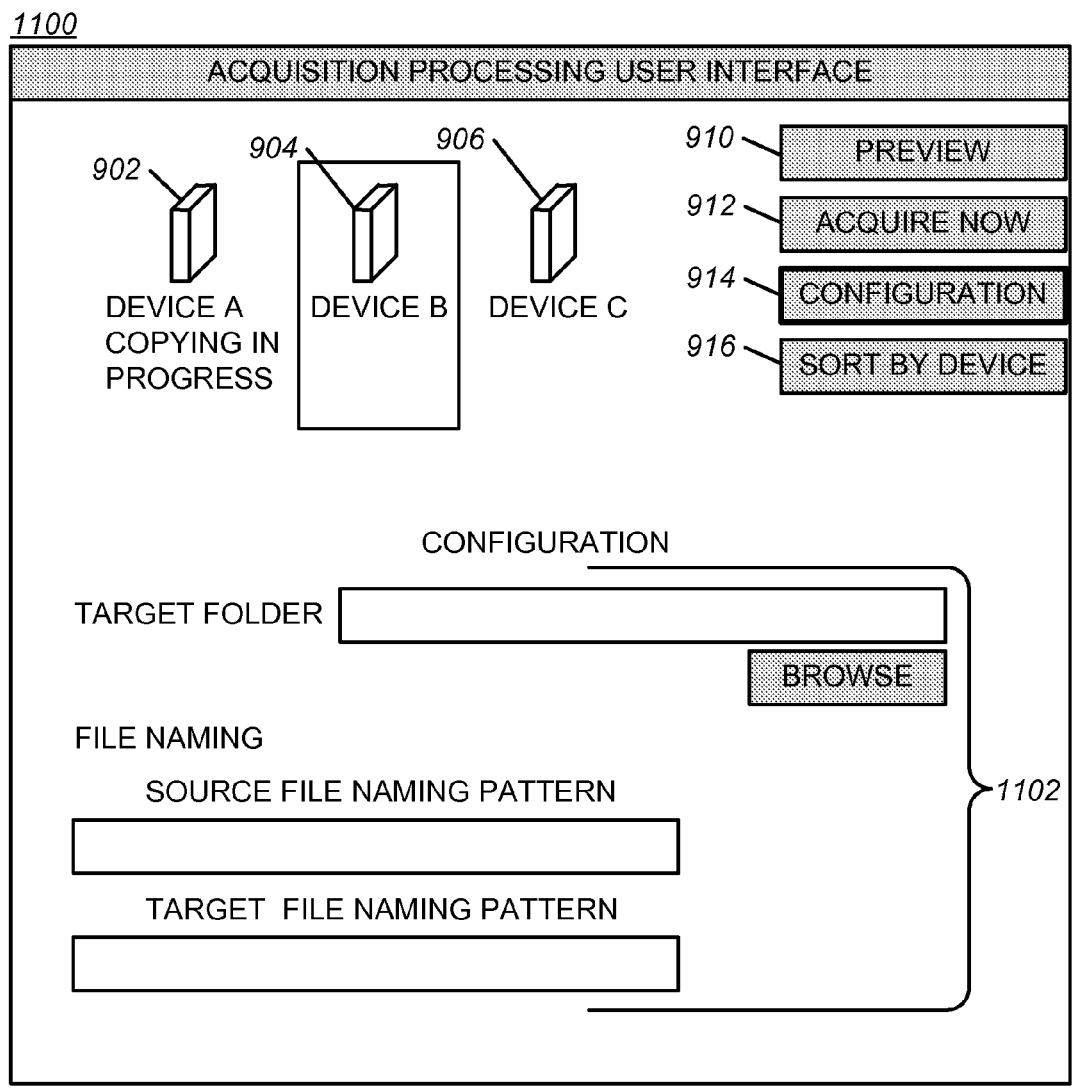

FIG. 11 shows an exemplary display 1100, with respect to a selected virtual device, such as, virtual device 904, in this example, after the user selects "configuration" button 914. Selection of "configuration" button 914 may cause windows 1102 to appear for entering and displaying configuration acquisition processing parameters, such as, for example, a target folder to which a cache may be created for storing files from a selected one or more of the virtual devices, a source file naming pattern indicating a format corresponding to file names from a source, and a target file naming pattern indicating a format corresponding to filenames in a cache stored within the target folder.

After selecting the one or more virtual devices and configuring the acquisition processing parameters, the user may select "acquire" button 912 to start, or initiate, the acquisition processing.

Displays 800-1100 are only exemplary and are not meant to be limiting with respect to displays in various embodiments. In other embodiments, additional, fewer, or different items may be displayed in an acquisition processing user interface.

Miscellaneous

Numerous variations of the above-mentioned exemplary embodiments may be implemented in other embodiments consistent with the subject matter of this disclosure. As an example of one variation, a user may connect, to a processing device, a storage device having a large amount of storage capacity, such as, for example, 16 GB, or another amount of storage. The user may initiate an acquisition dialog via a user interface, such as, for example, the acquisition processing user interface, to view contents of the storage device before the contents are completely copied to a cache. In this example, the processing device may determine that that the storage device is currently being copied to the cache. The processing device may then stop the copying of the contents to the cache and may retrieve information, such as, for example, thumbnail images or other information, from the storage device for displaying to the user. If the user requests that the files on the storage device be acquired, then the files may be acquired from the storage device instead of from the cache. Alternatively, copied files may be acquired from the cache and uncopied files may be acquired from the storage device.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described with respect to FIGS. 3-7, or may implement acts in a different order than as shown. Accordingly, the appended claims and their legal equivalents define the invention, rather than any specific examples given.

We claim as our invention:

1. A machine-implemented method for pre-caching and acquiring digital image files, the machine-implemented method comprising:

detecting, connected to a processing device, a device having digital image files stored therein;

automatically copying the digital image files and associated files from the device to a cache of the processing device;

acquisition processing of the digital image files and the associated files from the cache, the acquisition processing being performed independently of a completion of the copying of the digital images and the associated files to the cache; and automatically continuing the copying of uncopied ones of the digital image files and uncopied ones of the associated files to the cache after reconnecting the device, the device having been previously disconnected from the processing device before completion of the automatic copying.

2. The machine-implemented method of claim 1, further comprising:

detecting, connected to the processing device, a second device having a second plurality of digital image files and a second plurality of associated files stored therein, at least some of the second plurality of digital image files and at least some of the second plurality of associated files matching at least some of the digital image files and at least some of the associated files in the cache; and automatically copying to the cache only ones of the second plurality of digital image files not matching any of the digital image files stored in the cache and only ones of the second plurality of associated files not matching the associated files stored in the cache.

3. The machine-implemented method of claim 1, further comprising:

providing an indication to a user of a progress of the automatic copying of the digital images files and associated files from the device to the cache of the processing device.

4. The machine-implemented method of claim 1, further comprising:

acquisition processing of a plurality of digital image files and a second plurality of associated files from a plurality of caches, each of the plurality of caches corresponding to a respective virtual device.

5. The machine-implemented method of claim 1, further comprising:

receiving, via a user interface, a configuration with respect to the acquisition processing of the digital image files.

6. The machine-implemented method of claim 1, further comprising:

displaying a representation of each of a plurality of virtual devices, each of the plurality of virtual devices corresponding to a different cache of the processing device;

receiving a selection of at least one of the virtual devices;

displaying a preview of digital image files associated with the selected at least one of the virtual devices;

receiving a second selection of one or more of the at least one of the virtual devices; and acquisition processing digital image files and associated files for at least one cache corresponding to the second selected one or more of the at least one of the virtual devices.

7. The machine-implemented method of claim 1, wherein the automatically copying of the digital images files and the associated files from the device to the cache of the processing device further comprises:

creating at least one file in the cache including a type of the device and a storage capacity of the device.

8. The machine-implemented method of claim 1, further comprising:

providing an indication of a percentage of copying completed with respect to the digital image files and the associated files from the device.

9. A processing device comprising:

at least one processor;

a memory connected to the at least one processor, the memory comprising:

instructions for automatically copying digital image files and associated files from a device to a cache, instructions for initiating, at any time after a beginning of the automatic copying of the digital image files and the associated files to the cache, an acquisition process for processing the digital images files and the associated files from the cache; and instructions for continuing the automatic copying of uncopied ones of the digital image files and uncopied ones of the associated files from the device to the cache after an interruption of the automatic copying.

10. The processing device of claim 9, wherein the memory further comprises:

instructions for receiving, via a user interface, at least one condition for performing the automatic copying of the digital image files and the associated files to the cache, and instructions for performing the automatic copying of the digital image files and the associated files to the cache when the at least one condition is determined to be satisfied.

11. The processing device of claim 9, wherein the memory further comprises:

instructions for detecting a second device connected to the processing device, instructions for determining whether any digital files and any associated files of the second device match any of the digital files and any of the associated files in the cache, and instructions for automatically copying unmatching ones of the digital files and unmatching ones of the associated files of the second device to the cache when at least one of the digital files and at least one of the associated files of the second device matches any of the digital files and any of the associated files in the cache.

12. The processing device of claim 9, wherein the memory further comprises:

instructions for receiving, at any time after a beginning of the automatic copying of the digital image files and the associated files to the cache, a configuration for performing the acquisition process.

13. The processing device of claim 9, wherein the memory further comprises:

instructions for prompting a user to initiate the acquisition process with respect to the cache when a predetermined amount of time has passed, the predetermined amount of time being based on a predefined acquisition processing configuration parameter.

14. The processing device of claim 13, wherein the memory further comprises:

instructions for setting the predefined acquisition processing configuration parameter via a user interface.

15. A tangible machine-readable medium having instructions recorded thereon for at least one processor, the instructions comprising:

instructions for detecting a device newly connected to a processing device;

instructions for automatically copying files from the device to a cache of the processing device, the files including a plurality of digital image files;

instructions for performing acquisition processing, with respect to the files from the cache, at any time after the files begin to be automatically copied to the cache;

instructions for detecting whether a second device connected to the processing device has any files matching an inventory of the files stored in the cache; and instructions for automatically copying uncopied files from the second device to the cache when the second device is determined to have at least one file matching the inventory of the files stored in the cache.

16. The tangible machine-readable medium of claim 15, wherein the instructions for automatically copying the files from the device to a cache of the processing device further comprise:

instructions for determining whether a configuration indicates that at least a portion of contents of the device is to be automatically copied to the cache, and instructions for automatically copying at least the portion of the contents of the device to the cache when the configuration is determined to indicate that at least the portion of the contents of the device is to be automatically copied.

17. The tangible machine-readable medium of claim 15, further comprising:

instructions for capturing information regarding the device, the information including a type of the device, a capacity of the device, and an inventory of the files stored on the device; and instructions for storing the captured information in the cache.

18. The tangible medium of claim 15, further comprising:

instructions for configuring parameters for the acquisition processing from input received via a user interface.

19. The tangible machine-readable medium of claim 15, further comprising:

instructions for displaying thumbnail images with respect to a plurality of virtual devices, each of the virtual devices corresponding to a respective one of a plurality of caches;

instructions for sorting the displayed thumbnail images by virtual device;

instructions for receiving a selection of at least one of the plurality of virtual devices via a user interface; and instructions for performing the acquisition processing on ones of the plurality of digital images corresponding to the selected at least one of the plurality of virtual devices.

20. The tangible machine-readable medium of claim 15, further comprising:

instructions for prompting a user to initiate the acquisition processing with respect to the cache when a predetermined amount of time has passed, the predetermined amount of time having been set based on an input provided via a user interface.

* * * * *